(12) United States Patent
Wentink

(10) Patent No.: US 8,737,370 B2
(45) Date of Patent: May 27, 2014

(54) METHODS AND APPARATUSES FOR DIRECT LINK SETUP

(75) Inventor: Maarten Menzo Wentink, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 13/108,693

(22) Filed: May 16, 2011

(65) Prior Publication Data

US 2011/0280234 A1  Nov. 17, 2011

Related U.S. Application Data

(60) Provisional application No. 61/351,735, filed on Jun. 4, 2010, provisional application No. 61/345,430, filed on May 17, 2010.

(51) Int. Cl.
*H04W 4/00* (2009.01)

(52) U.S. Cl.
USPC .......................................................... 370/338

(58) Field of Classification Search
USPC .......................................................... 370/338
See application file for complete search history.

(56) References Cited

U.S. PATENT DOCUMENTS

| | | | | |
|---|---|---|---|---|
| 7,522,571 B2 * | 4/2009 | Ginzburg | ...................... | 370/338 |
| 7,545,771 B2 * | 6/2009 | Wentink et al. | ............... | 370/329 |
| 7,948,951 B2 * | 5/2011 | Wentink | ........................ | 370/338 |
| 2006/0215601 A1 * | 9/2006 | Vleugels et al. | .............. | 370/328 |
| 2007/0230423 A1 | 10/2007 | Yoshida et al. | | |
| 2010/0014458 A1 * | 1/2010 | Singh et al. | ................... | 370/328 |
| 2011/0103264 A1 | 5/2011 | Wentink | | |

OTHER PUBLICATIONS

IEEE 802.11 Working Group: "IEEE P802.11z/D6.0: Draft Standard for Information Technology—Local and metropolitan area networks—Specific requirements—Part 11: Wireless LAN Medium Access Control (MAC) and Physical Layer (PHY) specifications Amendment 6: Extensions to Direct Link Setup (DLS)", IEEE Standard, IEEE, Piscataway, NJ, USA Internet Citation, Aug. 1, 2009, pp. 1-67, XP002633074, Retrieved from the Internet: URL:http://ieeexplore.ieee.org/stamp/stamp.jsp"tp=&arnumber=5286951 [retrieved on Apr. 14, 2011].

(Continued)

*Primary Examiner* — Kenny Lin
(74) *Attorney, Agent, or Firm* — Charles E. Eggers

(57) ABSTRACT

Establishing a direct link connection between subscriber stations in a wireless local area network (WLAN) comprises transmitting a direct link setup discovery request from an initiating station to an access point of the WLAN for distribution to one or more other stations, the discovery request including information concerning a capability of the initiating station for a direct link setup, receiving information from a receiving station among the one or more other stations, the received information concerning the capability of the receiving station for a direct link setup, and establishing a direct link connection with the receiving station based on the received information.

29 Claims, 12 Drawing Sheets

(56) References Cited

OTHER PUBLICATIONS

IEEE Standard for Information Technology. Telecommunications and Information Exchange Between Systems. Local and Metropolitan Area Networks. Specific Requirements Part 11: Wireless LAN Medium Access Control (MAC) and Physical Layer (PHY) Specifications Am, Standard No. IEEE Std 802.11Z-2010 (2010) IEEE, USA IEEE New York, NY, USA, [Online] Oct. 14, 2010, XP002617166, ISBN: 978-0-7381-6499-1 Retrieved from the Internet: URL:http://ieeexplore.ieee.org/xpls/abs_all.jsp"arnumber=5605400&tag=1> [retrieved on Jan. 17, 2011] paragraphs [7.3.2.27], [7.4.7.11], [7.4.11.11], [11.21.3].

International Search Report and Written Opinion—PCT/US2011/036848, ISA/EPO—Sep. 13, 2011.

Michael Montemurro, Research in Motion; Menzo Wentink, Qualcomm: "doc: IEEE 802.11-09/1218r7; TDLS Peer Discovery", IEEE 802.11 Jan. 18, 2010, pp. 1-13, XP000002656379, Retrieved from the Internet: URL:https://mentor.ieee.org/802.11/dcn/09/11-09-1218-07-000z-td1s-peer-discovery.doc [retrieved on Aug. 4, 2011].

* cited by examiner

METHODS AND APPARATUSES FOR DIRECT LINK SETUP

CLAIM OF PRIORITY UNDER 35 U.S.C. §119

The present Application for Patent claims priority to Provisional Application No. 61/345,430 entitled "METHODS AND APPARATUS FOR DIRECT LINK DISCOVERY" filed May 17, 2010, and to Provisional Application No. 61/351,735 entitled "METHODS AND APPARATUS FOR DIRECT LINK DISCOVERY" filed Jun. 4, 2010, each assigned to the assignee hereof and hereby expressly incorporated by reference herein.

BACKGROUND

1. Field

The present disclosure relates generally to wireless local area network (WLAN) systems, and more specifically, to the establishment of direct links between subscriber stations in WLAN systems.

2. Background

In many telecommunication systems, communication networks are used to exchange messages among several interacting spatially-separated devices. The various types of networks may be classified in different aspects. In one example, the geographic scope of the network may be over a wide area, a metropolitan area, a local area, or a personal area, and the corresponding networks may be designated as wide area networks (WANs), metropolitan area networks (MANs), local area networks (LANs), or personal area networks (PANs). Networks may also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, Synchronous Optical Networking, Ethernet, etc.).

One distinguishing characteristic between communication networks is the choice of wired or wireless media for the transmission of electrical signals among the constituents of the network. In the case of wired networks, tangible physical media such as copper wire, coaxial cable, fiber optic cable, etc., are employed to propagate guided electromagnetic waveforms that carry message traffic over a distance. Wired networks are a static form of communication networks and are typically favored for interconnection of fixed network elements or for bulk data transfer. For example, fiber optic cables may be the preferred transmission media for very high throughput transport applications over long distances between large network hubs, such as bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks may employ intangible physical media in an unguided propagation mode using electromagnetic waves in the radio, microwave, infra-red, optical, etc., frequency bands. Wireless networks have the distinct advantage of facilitating user mobility and rapid field deployment compared to fixed wired networks. However, usage of wireless propagation requires significant active resource management among the network users and higher levels of mutual coordination and cooperation for compatible spectrum utilization.

Accordingly, many wireless communication networks use Access Points (APs) to manage system resources among users, which may be referred to as subscriber stations or simply stations (STAs). Nevertheless, some wireless networking protocols provide for direct link communications among the STAs outside of the AP's mediation. This allows STAs associated with the same AP, for example, to set up a direct link between them. However, conventional discovery of other STAs capable of establishing a direct link has been based on the initiating STA detecting source and destination addresses, and sending a setup request without prior knowledge of the intended peer STA's capabilities.

There is therefore a need in the art for improved device discovery in establishing a direct link between STAs, so that a list of potential peer STAs that are direct-link capable may be discovered before attempting direct link setup.

SUMMARY

Embodiments disclosed herein address the above stated needs by providing methods and apparatuses for establishing a direct link connection between subscriber stations in a wireless local area network (WLAN).

In one aspect, a method is provided for establishing a direct link connection between subscriber stations in a WLAN. The method comprises: transmitting a direct link setup discovery request from an initiating station to an access point of the WLAN for distribution to one or more other stations, the discovery request including information concerning a capability of the initiating station for a direct link setup; receiving information from a receiving station among the one or more other stations, the received information concerning the capability of the receiving station for a direct link setup; and establishing a direct link connection with the receiving station based on the received information.

In another aspect, another method is provided for establishing a direct link connection between subscriber stations in a WLAN. The method comprises: receiving a direct link setup discovery request from an initiating station via an access point of the WLAN, the discovery request including information concerning a capability of the initiating station for a direct link setup; transmitting information concerning a capability of a receiving station for a direct link setup; and establishing a direct link connection with the initiating station based on the received information.

In yet another aspect, an apparatus is provided for establishing a direct link connection between subscriber stations in a WLAN. The apparatus comprises transceiver logic and a link controller. The transceiver logic is configured to transmit a direct link setup discovery request from an initiating station to an access point of the WLAN for distribution to one or more other stations, the discovery request including information concerning a capability of the initiating station for a direct link setup, and to receive information from a receiving station among the one or more other stations, the received information concerning the capability of the receiving station for a direct link setup. The link controller is configured to establish a direct link connection with the receiving station based on the received information.

In yet another aspect, another apparatus is provided for establishing a direct link connection between subscriber stations in a WLAN. The apparatus comprises transceiver logic and a link controller. The transceiver logic is configured to receive a direct link setup discovery request from an initiating station via an access point of the WLAN, the discovery request including information concerning a capability of the initiating station for a direct link setup, and to transmit information concerning a capability of a receiving station for a direct link setup. The link controller is configured to establish a direct link connection with the initiating station based on the received information.

In yet another aspect, another apparatus is provided for establishing a direct link connection between subscriber stations in a WLAN. The apparatus comprises: means for transmitting a direct link setup discovery request from an initiating station to an access point of the WLAN for distribution to one or more other stations, the discovery request including information concerning a capability of the initiating station for a direct link setup; means for receiving information from a receiving station among the one or more other stations, the received information concerning the capability of the receiving station for a direct link setup; and means for establishing a direct link connection with the receiving station based on the received information.

In yet another aspect, an apparatus is provided for establishing a direct link connection between subscriber stations in a WLAN. The apparatus comprises: means for receiving a direct link setup discovery request from an initiating station via an access point of the WLAN, the discovery request including information concerning a capability of the initiating station for a direct link setup; means for transmitting information concerning a capability of a receiving station for a direct link setup; and means for establishing a direct link connection with the initiating station based on the received information.

In yet another aspect, a non-transitory computer-readable medium is provided that comprises code, which, when executed by a processor, causes the processor to perform operations for establishing a direct link connection between subscriber stations in a WLAN. The computer-readable medium comprises: code for transmitting a direct link setup discovery request from an initiating station to an access point of the WLAN for distribution to one or more other stations, the discovery request including information concerning a capability of the initiating station for a direct link setup; code for receiving information from a receiving station among the one or more other stations, the received information concerning the capability of the receiving station for a direct link setup; and code for establishing a direct link connection with the receiving station based on the received information.

In yet another aspect, another non-transitory computer-readable medium is provided that comprises code, which, when executed by a processor, causes the processor to perform operations for establishing a direct link connection between subscriber stations in a WLAN. The computer-readable medium comprises: code for receiving a direct link setup discovery request from an initiating station via an access point of the WLAN, the discovery request including information concerning a capability of the initiating station for a direct link setup; code for transmitting information concerning a capability of a receiving station for a direct link setup; and code for establishing a direct link connection with the initiating station based on the received information.

DETAILED DESCRIPTION

Figure 1:
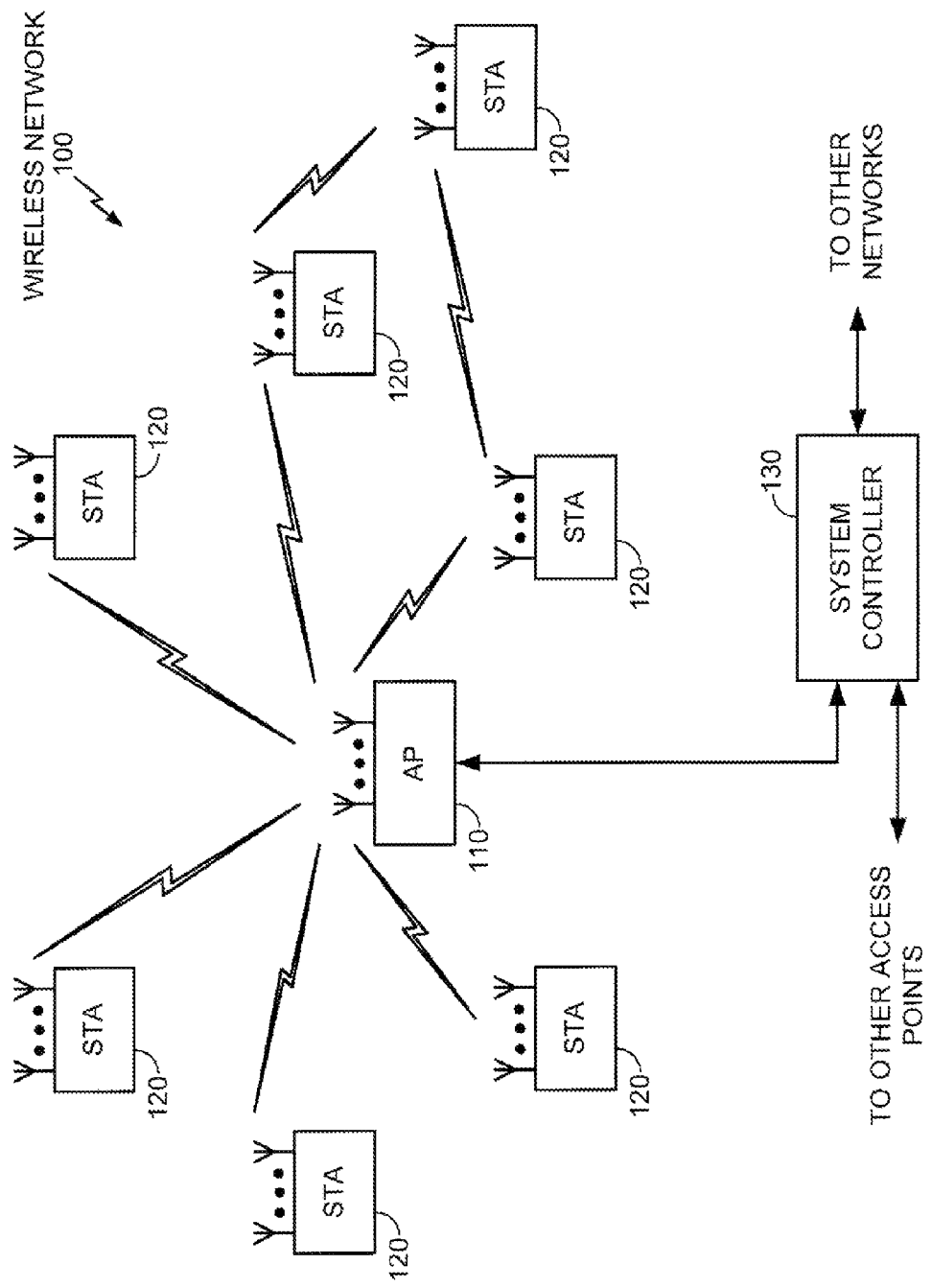
FIG. 1 illustrates an example wireless network.

Various embodiments of the present invention are described below with reference to the drawings, wherein like reference numerals are used to refer to like elements throughout. The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. The word "exemplary" is used herein to mean "serving as an example, instance, or illustration." Any embodiment described herein as "exemplary" is not necessarily to be construed as preferred or advantageous over other embodiments.

FIG. 1 illustrates an example wireless network 100. As shown, the wireless network 100, which may also be referred to herein as a basic service set (BSS), is formed from several wireless nodes, generally designated as an access point (AP) 110 and a plurality of access terminals or subscriber stations (STAs) 120. Each wireless node is generally capable of receiving and/or transmitting. The wireless network 100 may support any number of APs 110 distributed throughout a geographic region to provide coverage for the STAs 120. A system controller 130 may be used to provide coordination and control among the APs 110, as well as access to other networks (e.g., the Internet) for the STAs 120. For simplicity, one AP 110 is shown in FIG. 1.

The AP 110 is generally a fixed terminal that provides backhaul services to the STAs 120 in its geographic region of coverage. However, the AP 110 may be mobile in some applications. The STAs 120 may be fixed or mobile. Examples of STAs 120 include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may sometimes be referred to as a wireless local area network (WLAN), and may employ a variety of widely used networking protocols to interconnect nearby devices, such as WiFi, or, more generally, any member of the Institute of Electrical and Electronics Engineers (IEEE) 802.11 wireless protocol family. In general, the wireless network 100 may provide operation in two distinct modes: infrastructure mode and ad-hoc mode. In infrastructure mode, the AP 110 serves as a hub for connecting the STAs 120 to each other or to the network infrastructure through various backhaul services, including, for example, Internet access. Infrastructure mode typically uses a client-server architecture to provide connectivity for and among the STAs 120. In ad-hoc mode, the STAs 120 may engage in direct link communications with each other in a peer-to-peer architecture.

One example networking protocol that provides direct link communications among STAs (e.g., STAs 120) is IEEE 802.11z, which defines a protocol for STAs associated with the same AP to set up a direct link between the STAs. The protocol is referred to as Tunneled Direct Link Setup (TDLS). TDLS setup messages are encapsulated in a specific Ethertype, so that they may be tunneled through any AP. In one design, the Ethertype is a field within an Ethernet frame that indicates the protocol encapsulated within the frame payload. This approach may be advantageous in that the AP does not have to be specially modified for TDLS to be used between associated STAs. Accordingly, TDLS direct links may be setup between two TDLS-capable STAs without the need to upgrade the AP.

Conventionally, TDLS assumes that discovery of other STAs in the same Basic Service Set (BSS) (i.e., associated with the same AP) is based on detecting source and destination addresses, and sending a TDLS setup request without prior knowledge of the intended peer STAs' capabilities. However, it is desirable to provide a more deterministic method of discovery, so that a list of potential peer STAs that are TDLS-capable may be discovered before attempting a TDLS direct link setup.

Figure 2:
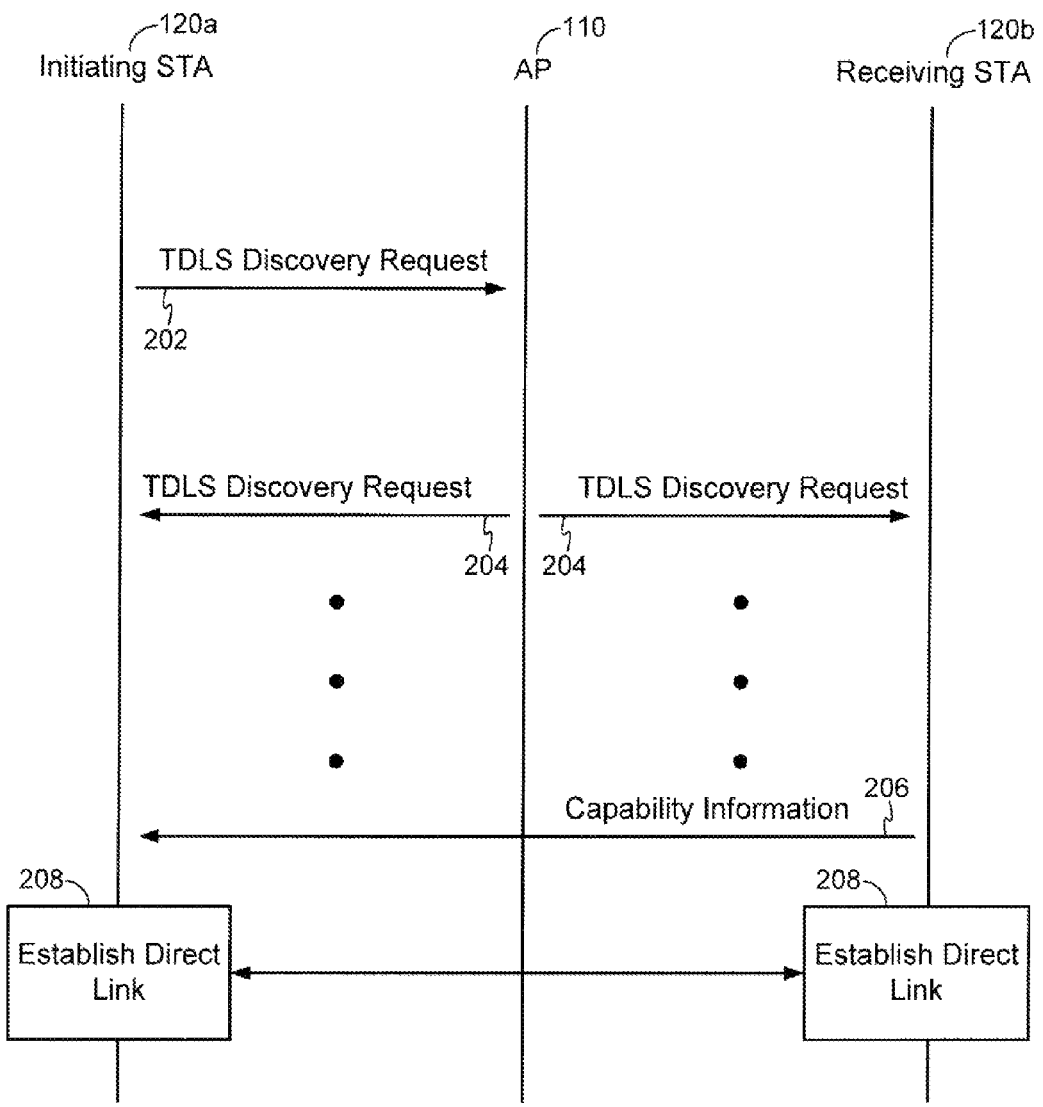
FIG. 2 illustrates an example call flow diagram for establishing a direct link connection such as Tunneled Direct Link Setup (TDLS) between stations (STAs) in a wireless local area network (WLAN) according to one or more embodiments.

FIG. 2 illustrates an example call flow diagram for establishing a direct link connection such as TDLS between STAs in a WLAN according to one or more embodiments. In this example, a TDLS discovery request 202 is initially transmitted from an initiating STA 120a to the AP 110 with which the initiating STA 120a is in communication. The discovery request 202 includes information concerning a capability of the initiating STA 120a, which may be used for a direct link setup. It will be appreciated that although a TDLS discovery request is shown for illustration purposes, other types of direct link discovery requests may be employed as well, depending on the particular application.

The AP 110 proceeds to distribute the capability information to other STAs associated with the AP 110, including the illustrated receiving STA 120b, via a discovery request broadcast 204. Upon receipt of the discovery request broadcast 204, the receiving STA 120b may check the included BSS identifier (BSSID) to determine if the discovery request broadcast 204 matches the BSSID of the AP 110 associated with the receiving STA 120b. If so, the receiving STA 120b may transmit its own information 206 concerning a capability of the receiving STA 120b for a direct link setup with peer STAs.

In order to receive the capability information 206, the initiating STA 120a may refrain from entering a sleep mode, and instead remain awake for some period of time after sending the TDLS discovery request 202. As shown, the capability information 206 may be a direct or an indirect response to the discovery request broadcast 204 in that there may be various intervening messages. Thus, in some embodiments, the capability information 206 from the receiving STA 120b may be elicited by further signaling, from the initiating STA 120a or otherwise. In addition, the capability information 206 may be transmitted after some backoff period in relation to one or more of the preceding messages. The backoff period may be random or predetermined.

The capability information 206 may be received by the initiating STA 120a and used to establish a direct link with the receiving STA 120b (blocks 208). For simplicity, only one such receiving STA 120b is illustrated in FIG. 2. However, in general, the discovery request may be broadcast to some or all of the STAs associated with the AP 110, including the initiating STA 120a itself, and the initiating STA 120a may establish a direct link with one or more other STAs based on any capability information the initiating STA 120a receives.

Figure 3:
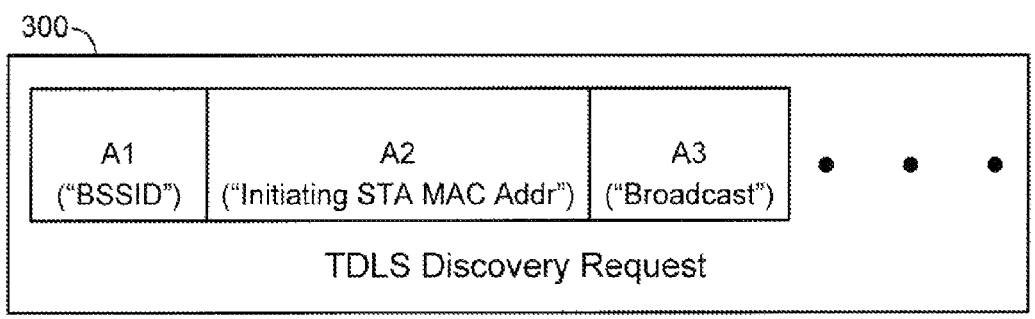
FIG. 3 illustrates an example TDLS discovery request frame transmitted by an initiating STA.

FIG. 3 illustrates an example TDLS discovery request frame transmitted by an initiating STA, such as STA 120a. As shown, the discovery request frame 300 includes, among other fields, a first address field A1 identifying the AP associated with the initiating STA (e.g., by its BSSID), a second address field A2 identifying the initiating STA (e.g., by its Media Access Control, or MAC, address), and a third address field A3 identifying the type of message being conveyed, which for the TDLS discovery request may be a "broadcast" type. The group of addresses A1, A2, and A3 may be referred to collectively as a link identifier element.

Returning to the example of FIG. 2, the TDLS discovery request 202 transmitted by the initiating STA 120a may include a TDLS discovery request frame 300 having a first address field A1 identifying the BSSID of the AP 110 associated with the initiating STA 120a, a second address field A2 identifying the MAC address of the initiating STA 120a, and a third address field A3 identifying the broadcast type of message being conveyed.

It will be appreciated that other information may also be included in the TDLS discovery request frame 300. For example, the TDLS discovery request frame 300 may also contain a portion including one or more predetermined bits randomly selected to form a "nonce" as a guard against replay attacks by an unknown observer. It will also be appreciated that the order of the information conveyed may vary from the order shown in the example of FIG. 3.

The information concerning the capability of the receiving STA 120b for a direct link setup may be conveyed to the initiating STA 120a in many ways. In some embodiments, for example, the information may be transmitted via a probe request message or a probe response message, while in other embodiments, the information may be transmitted via a TDLS discovery response broadcasted by the receiving STA 120b as a directed broadcast to some or all of the nearby STAs in response to a TDLS discovery request.

Figure 4:
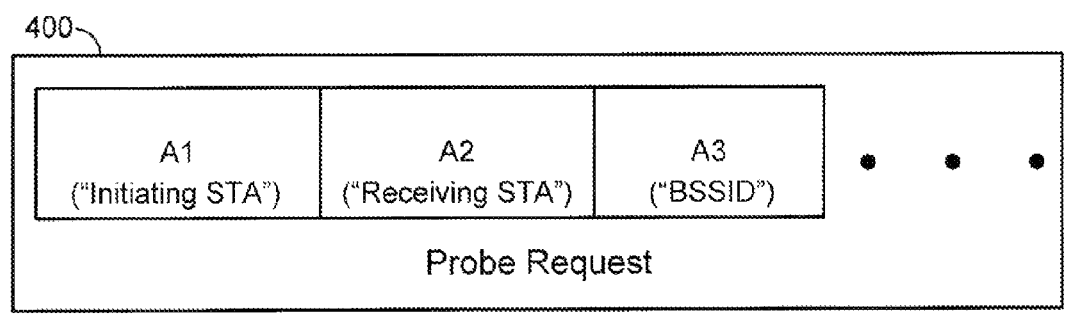
FIG. 4 illustrates an example TDLS probe request frame.

FIG. 4 illustrates an example TDLS probe request frame. The probe request frame 400 shown includes a link identifier element having addresses A1, A2, and A3, and may be transmitted, for example, by the receiving STA 120b to the initiating STA 120a in response to a discovery request broadcast by the AP 110 such as the TDLS discovery request 204. Conveyed via a first address A1 in this example is information identifying the initiating STA 120a, which may include a MAC address, as the intended recipient of the probe request frame 400. At address A2 in this example is information identifying the receiving STA 120b, which may also include a MAC address, as the transmitter of the probe request frame 400. At address A3 in this example is an indicator as to the BSSID associated with the AP 110. It will be appreciated that other information may also be included in the probe request 400, and that the order of the information may vary from the order shown in the example of FIG. 4.

Figure 5:
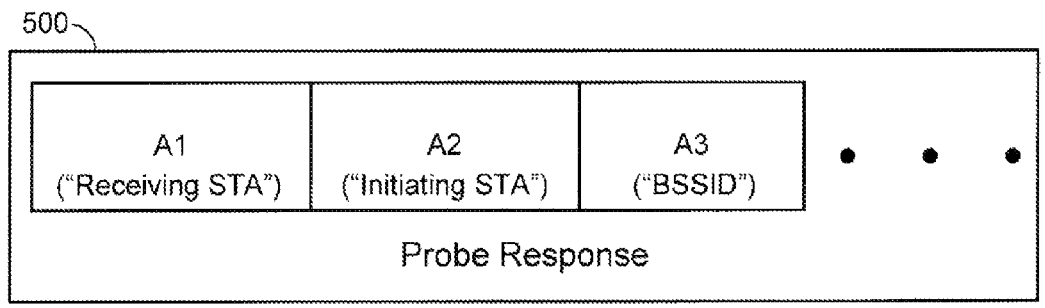
FIG. 5 illustrates an example TDLS probe response frame.

FIG. 5 illustrates an example TDLS probe response frame. The probe response frame 500 shown includes a link identifier element having addresses A1, A2, and A3, and may be transmitted, for example, by the initiating STA 120a to the receiving STA 120b in response to a probe request frame such as probe request frame 400. Conveyed via a first address A1 in this example is information identifying the receiving STA 120b, which may include a MAC address, as the intended recipient of the probe response frame 500. At address A2 in this example is information identifying the initiating STA 120a, which may also include a MAC address, as the transmitter of the probe response frame 500. At address A3 in this example is an indicator as to the BSSID associated with the AP 110. It will be appreciated that other information may also be included in the probe response 500, and that the order of the information may vary from the order shown in the example of FIG. 5.

Figure 6:
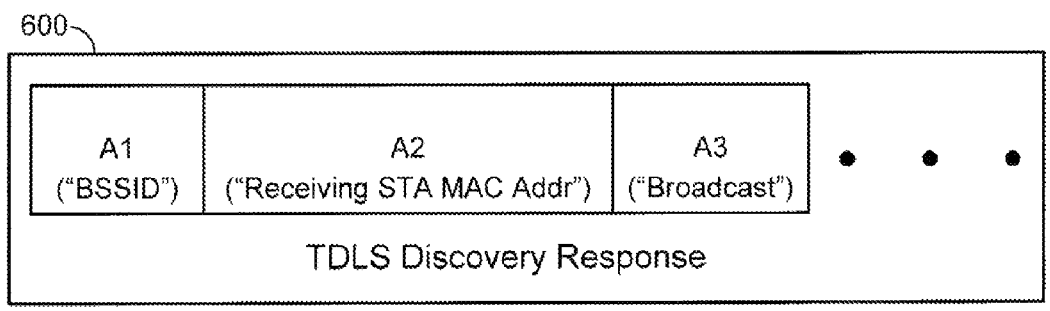
FIG. 6 illustrates an example TDLS discovery response frame.

FIG. 6 illustrates an example TDLS discovery response frame. The discovery response frame 600 includes a link identifier element having addresses A1, A2, and A3, and may be broadcast, for example, by the receiving STA 120b to nearby STAs in response to a discovery request frame such as TDLS discovery request frame 300. Conveyed via a first address A1 in this example is an indicator as to the BSSID associated with the AP 110. At address A2 in this example is information identifying the receiving STA 120b, which may include a MAC address, and at address A3 in this example is information identifying the type of message being conveyed, which for the TDLS discovery response is also a "broadcast" type. It will be appreciated that other information may also be included in the discovery response 600, and that the order of the information may vary from the order shown in the example of FIG. 6.

Probe requests, probe responses, and discovery responses such as those illustrated in FIGS. 4-6 may be used in a variety of ways to facilitate the establishment of a direct link between, for example, the initiating STA 120a and the receiving STA 120b. Several example call flows are illustrated in FIGS. 7-12, which are discussed in more detail below.

Figure 7:
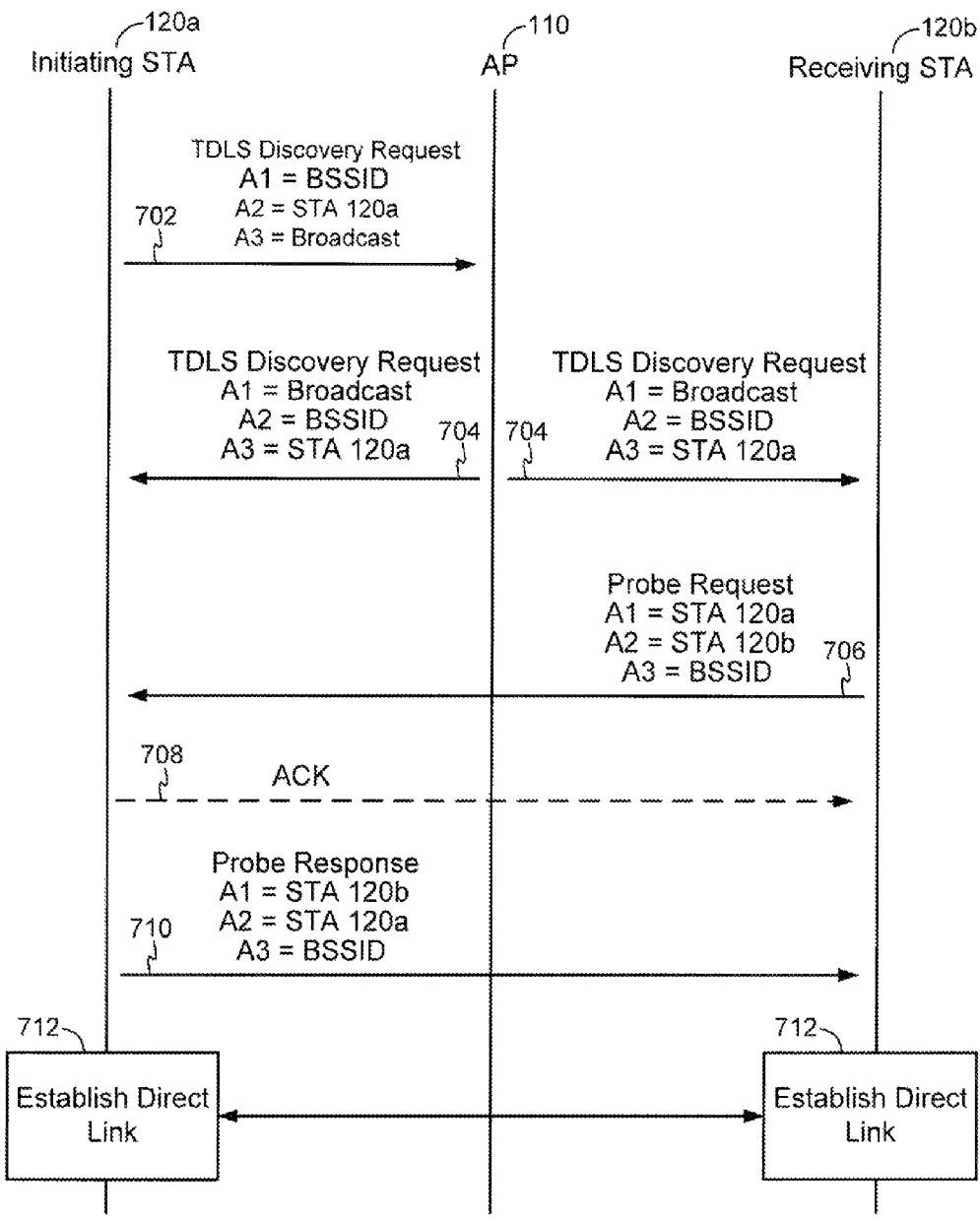
FIG. 7 illustrates an example call flow diagram for establishing a direct link connection between STAs using probe request and probe response messages according to one or more embodiments.

FIG. 7 illustrates an example call flow diagram for establishing a direct link connection between STAs using probe request and probe response messages according to one or more embodiments. For illustration purposes, an example link identifier element of each signaling message is shown explicitly. As in the example of FIG. 3, the initiating STA 120a initially transmits a TDLS discovery request 702 to the AP 110 including information concerning a capability of the initiating STA 120a, which may be used for a direct link setup. The AP 110 then proceeds to broadcast the capability information in a discovery request broadcast 704 to other STAs associated with the AP 110, including the receiving STA 120b.

Upon receipt of the discovery request broadcast 704, the receiving STA 120b transmits a probe request 706 to the initiating STA 120a. The probe request 706 includes information concerning a capability of the receiving STA 120b for a direct link setup. In some designs, the initiating STA 120a may optionally send an acknowledgment (ACK) 708 to the receiving STA 120b in response to the probe request 706. The initiating STA 120a then sends a probe response 710 to the receiving STA 120b, typically after some backoff period. The initiating STA 120a and the receiving STA 120b may subsequently establish a direct link with each other (blocks 712). As shown, the probe request and probe response messages may include a link identifier specifying the transmitting STA, the intended recipient STA, and the associated AP, as discussed above with reference to FIGS. 4 and 5, in addition to any capability information for the STA transmitting the message.

In other embodiments, the initiating STA 120a and receiving STA 120b may initiate a direct link setup simply using probe response messages without corresponding probe request messages.

Figure 8:
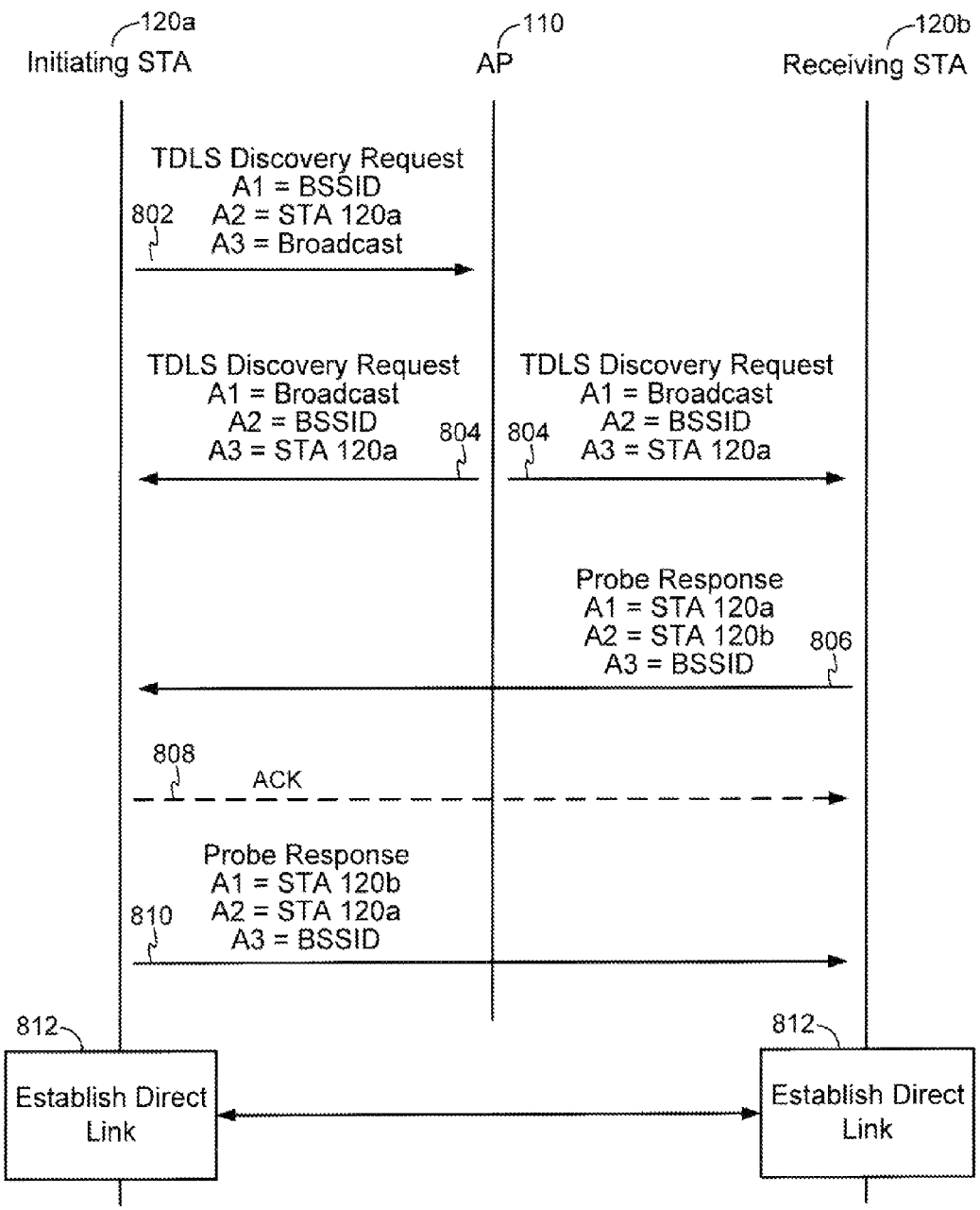
FIG. 8 illustrates an example call flow diagram for establishing a direct link connection between STAs using probe response messages according to one or more embodiments.

FIG. 8 illustrates an example call flow diagram for establishing a direct link connection between STAs using probe response messages according to one or more embodiments. For illustration purposes, an example link identifier element of each signaling message is again shown explicitly. As in the example of FIG. 3 and others, the initiating STA 120a initially transmits a TDLS discovery request 802 to the AP 110 including information concerning a capability of the initiating STA 120a, which may be used for a direct link setup. The AP 110 then proceeds to broadcast the capability information in a discovery request broadcast 804 to other STAs associated with the AP 110, including the receiving STA 120b.

Upon receipt of the discovery request broadcast 804, the receiving STA 120b transmits a probe response 806 to the initiating STA 120a. The probe response 806 includes information concerning a capability of the receiving STA 120b for a direct link setup. In some designs, the initiating STA 120a may optionally send an ACK 808 to the receiving STA 120b in response to the probe response 806. The initiating STA 120a then sends its own probe response 810 to the receiving STA 120b, typically after some backoff period. The initiating STA 120a and the receiving STA 120b may subsequently establish a direct link with each other (blocks 812). As shown, the probe response messages may include a link identifier specifying the transmitting STA, the intended recipient STA, and the associated AP, as discussed above with reference to FIG. 5, in addition to any capability information for the STA transmitting the message.

In still other embodiments, the capability information of the receiving STA 120b may be elicited by further signaling from the initiating STA 120a, following a TDLS discovery request broadcast.

Figure 9:
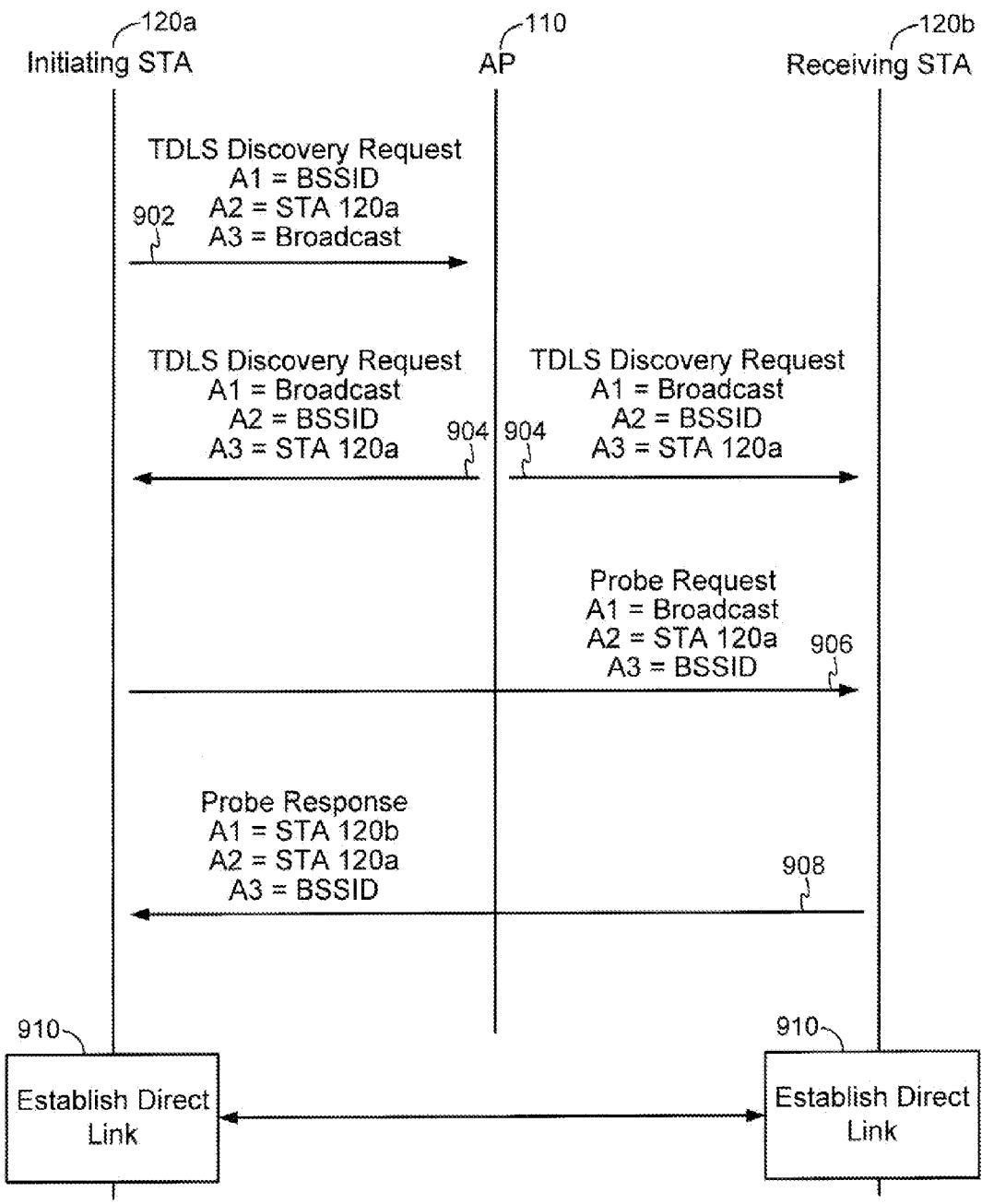
FIG. 9 illustrates an example call flow diagram for establishing a direct link connection between STAs using a probe response message broadcast to elicit capability information from a receiving STA according to one or more embodiments.

FIG. 9 illustrates an example call flow diagram for establishing a direct link connection between STAs using a probe response message broadcast to elicit capability information from a receiving STA according to one or more embodiments. For illustration purposes, an example link identifier element of each signaling message is again shown explicitly. As in the example of FIG. 3 and others, the initiating STA 120a initially transmits a TDLS discovery request 902 to the AP 110 including information concerning a capability of the initiating STA 120a, which may be used for a direct link setup. The AP 110 then proceeds to broadcast the capability information in a discovery request broadcast 904 to other STAs associated with the AP 110, including the receiving STA 120b.

Upon receipt of the discovery request broadcast 904, the receiving STA 120b initially takes no action, other than remaining awake for some subsequent period of time to receive further messages. In this example, the initiating STA 120a follows up the discovery request broadcast 904 with a probe request broadcast 906 transmitted to nearby STAs, including the receiving STA 120b. As shown, the probe request broadcast 906 may be a direct broadcast among peer STAs (i.e., not via the AP 110), such as by addressing it to the broadcast Receiver Address (RA). The probe request broadcast 906 elicits information concerning a capability of the receiving STA 120b, among other STAs, for a direct link setup. The initiating STA 120a then sends a probe response 908 to the receiving STA 120b, typically after some backoff period. The initiating STA 120a and the receiving STA 120b may subsequently establish a direct link with each other (blocks 910). As shown, the probe request and probe response messages may include a link identifier specifying the transmitting STA, the intended recipient STA(s), and the associated AP, as discussed above with reference to FIGS. 4 and 5, in addition to any capability information for the STA transmitting the message.

In still other embodiments, the capability information of the receiving STA 120b may be communicated to other nearby STAs in addition to the initiating STA 120a, as a public action frame. In this case, the public action frame is broadcast as a direct broadcast among peer STAs (i.e., not via the AP), such as by addressing it to the broadcast RA. A public action frame direct broadcast containing the capability information of the receiving STA 120b may be transmitted in various formats, such as a probe request message, a probe response message, or a TDLS discovery response message.

Figure 10:
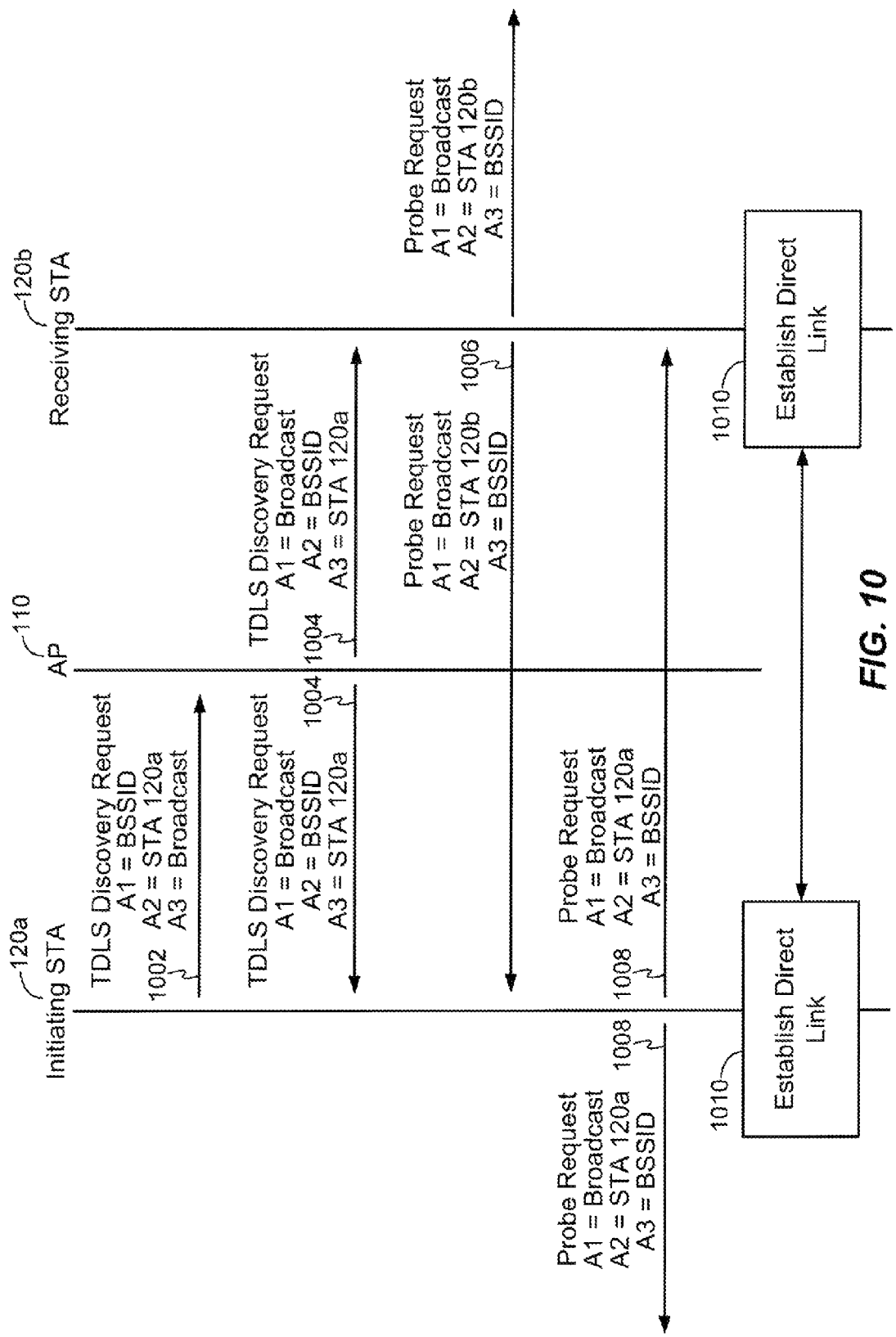
FIG. 10 illustrates an example call flow diagram for establishing a direct link connection between STAs using probe request messages broadcast as public action frames according to one or more embodiments.

FIG. 10 illustrates an example call flow diagram for establishing a direct link connection between STAs using probe request messages broadcast as public action frames according to one or more embodiments. For illustration purposes, an example link identifier element of each signaling message is again shown explicitly. As in the example of FIG. 3 and others, the initiating STA 120a initially transmits a TDLS discovery request 1002 to the AP 110 including information concerning a capability of the initiating STA 120a, which may be used for a direct link setup. The AP 110 then proceeds to broadcast the capability information in a discovery request broadcast 1004 to other STAs associated with the AP 110, including the receiving STA 120b.

Upon receipt of the discovery request broadcast 1004, the receiving STA 120b broadcasts a probe request 1006 via a direct broadcast to nearby STAs, including the initiating STA 120a, typically after some backoff period. The probe request 1006 includes information concerning a capability of the receiving STA 120b for a direct link setup. The probe request 1006 is received by at least the initiating STA 120a, among other STAs. The initiating STA 120a may also receive the discovery request broadcast 1004 and respond by broadcasting its own probe request 1008 to nearby STAs, including the receiving STA 120b, again typically after some backoff period. The initiating STA 120a and the receiving STA 120b may subsequently establish a direct link with each other (blocks 1010). As shown, the probe request messages may include a link identifier specifying the transmitting STA, the intended recipient STAs (i.e., the "broadcast" RA in this example), and the associated AP, as discussed above with reference to FIG. 4, in addition to any capability information for the STA transmitting the message.

Figure 11:
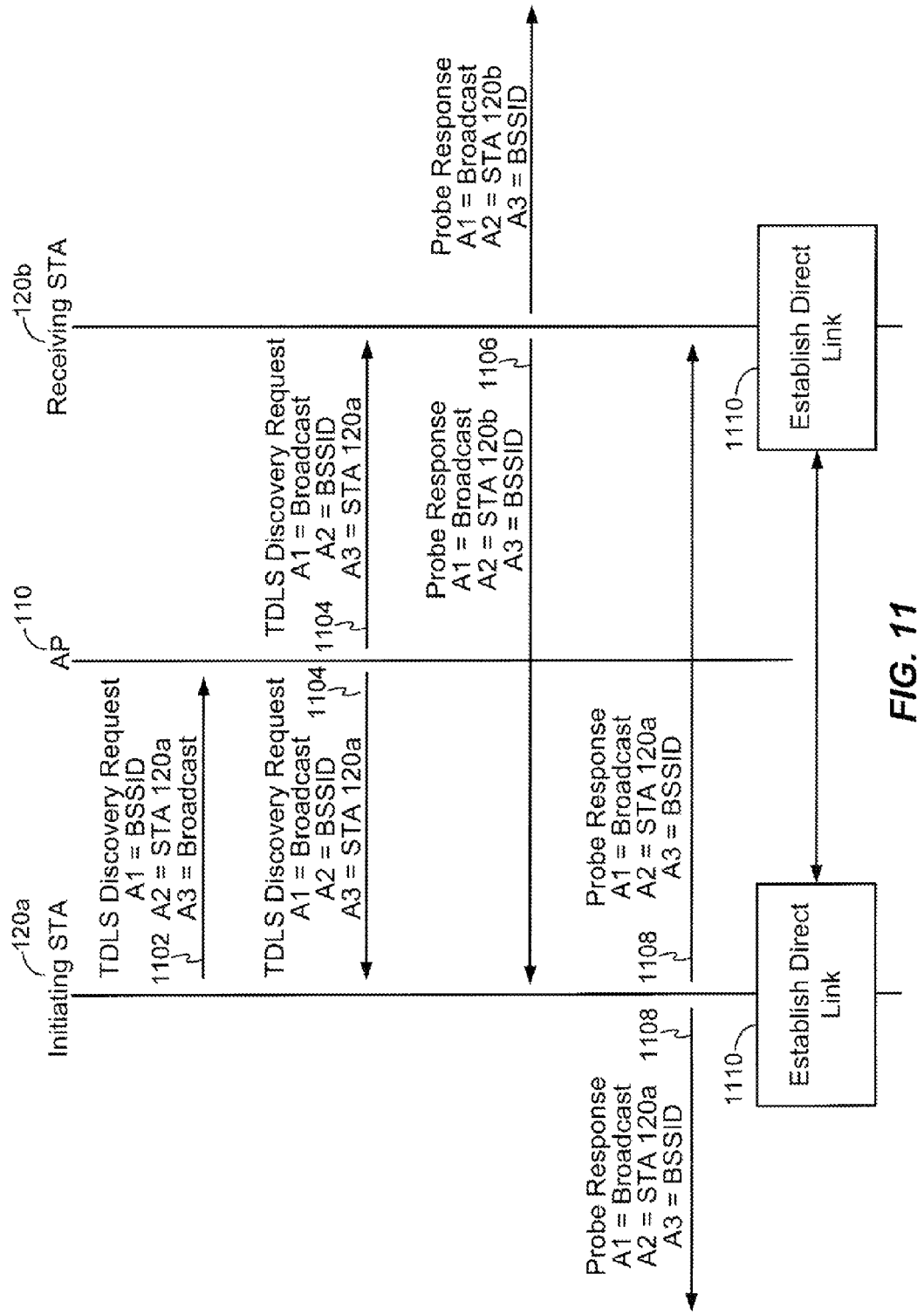
FIG. 11 illustrates an example call flow diagram for establishing a direct link connection between STAs using probe response messages broadcast as public action frames according to one or more embodiments.

FIG. 11 illustrates an example call flow diagram for establishing a direct link connection between STAs using probe response messages broadcast as public action frames according to one or more embodiments. For illustration purposes, an example link identifier element of each signaling message is again shown explicitly. As in the example of FIG. 3 and others, the initiating STA 120a initially transmits a TDLS discovery request 1102 to the AP 110 including information concerning a capability of the initiating STA 120a, which may be used for a direct link setup. The AP 110 then proceeds to broadcast the capability information in a discovery request broadcast 1104 to other STAs associated with the AP 110, including the receiving STA 120b.

Upon receipt of the discovery request broadcast 1104, the receiving STA 120b broadcasts a probe response 1106 via a direct broadcast to nearby STAs, including the initiating STA 120a, typically after some backoff period. The probe response 1106 includes information concerning a capability of the receiving STA 120b for a direct link setup. The probe response 1106 is received by at least the initiating STA 120a, among other STAs. The initiating STA 120a may also receive the discovery request broadcast 1104 and respond by broadcasting its own probe response 1108 to nearby STAs, including the receiving STA 120b, again typically after some backoff period. The initiating STA 120a and the receiving STA 120b may subsequently establish a direct link with each other (blocks 1110). As shown, the probe response messages may include a link identifier specifying the transmitting STA, the intended recipient STAs (i.e., the "broadcast" RA in this example), and the associated AP, as discussed above with reference to FIG. 5, in addition to any capability information for the STA transmitting the message.

Figure 12:
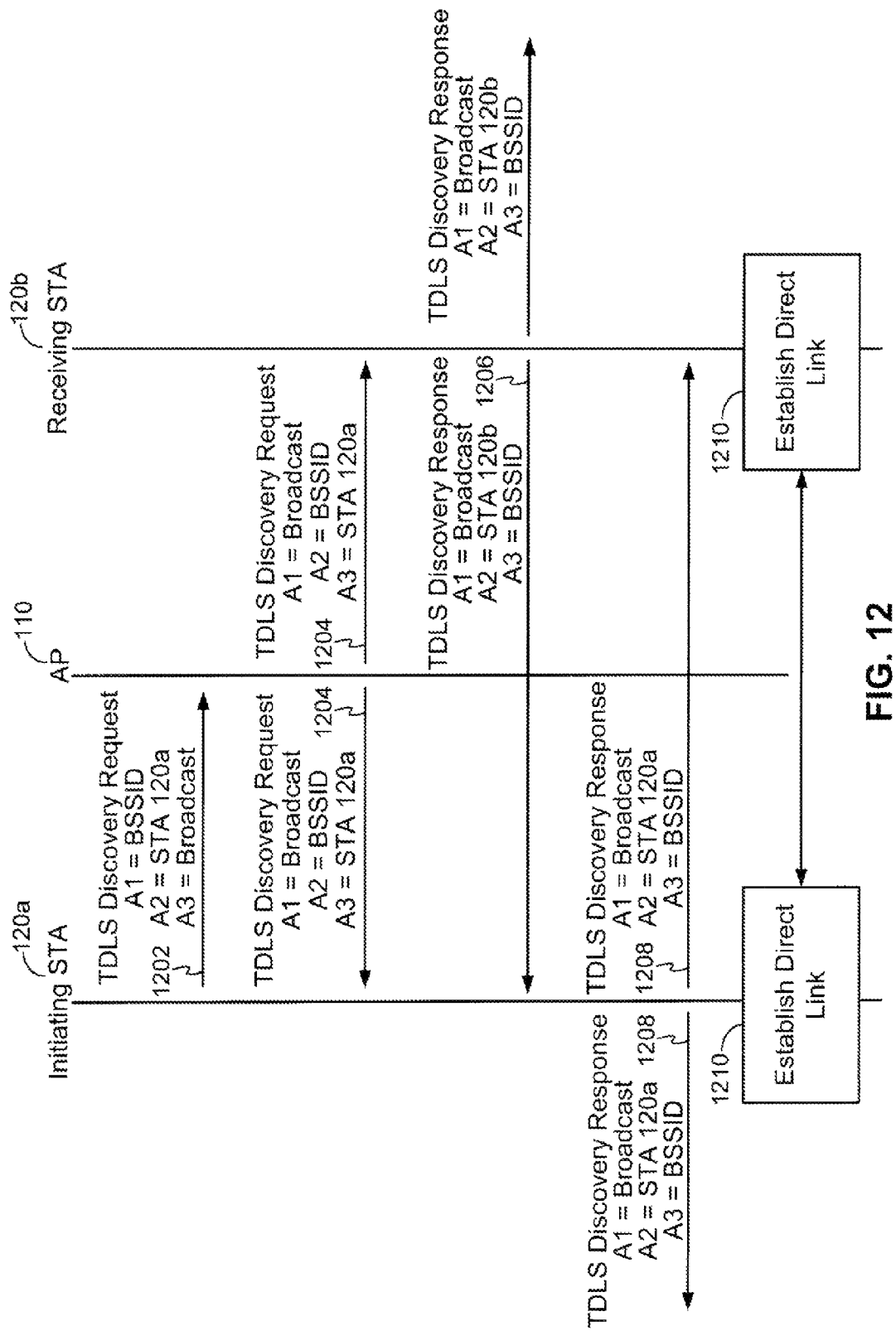
FIG. 12 illustrates an example call flow diagram for establishing a direct link connection between STAs using discovery response messages broadcast as public action frames according to one or more embodiments.

FIG. 12 illustrates an example call flow diagram for establishing a direct link connection between STAs using discovery response messages broadcast as public action frames according to one or more embodiments. For illustration purposes, an example link identifier element of each signaling message is again shown explicitly. As in the example of FIG. 3 and others, the initiating STA 120a initially transmits a TDLS discovery request 1202 to the AP 110 including information concerning a capability of the initiating STA 120a, which may be used for a direct link setup. The AP 110 then proceeds to broadcast the capability information in a discovery request broadcast 1204 to other STAs associated with the AP 110, including the receiving STA 120b.

Upon receipt of the discovery request broadcast 1204, the receiving STA 120b broadcasts a discovery response 1206 via a direct broadcast to nearby STAs, including the initiating STA 120a, typically after some backoff period. The discovery response 1206 includes information concerning a capability of the receiving STA 120b for a direct link setup. The discovery response 1206 is received by at least the initiating STA 120a, among other STAs. The initiating STA 120a may also receive the discovery request broadcast 1204 and respond by broadcasting its own discovery response 1208 to nearby STAs, including the receiving STA 120b, again typically after some backoff period. The initiating STA 120a and the receiving STA 120b may subsequently establish a direct link with each other (blocks 1210). As shown, the discovery response messages may include a link identifier specifying the transmitting STA, the intended recipient STAs (i.e., the "broadcast" RA in this example), and the associated AP, as discussed above with reference to FIG. 6, in addition to any capability information for the STA transmitting the message.

Figure 13:
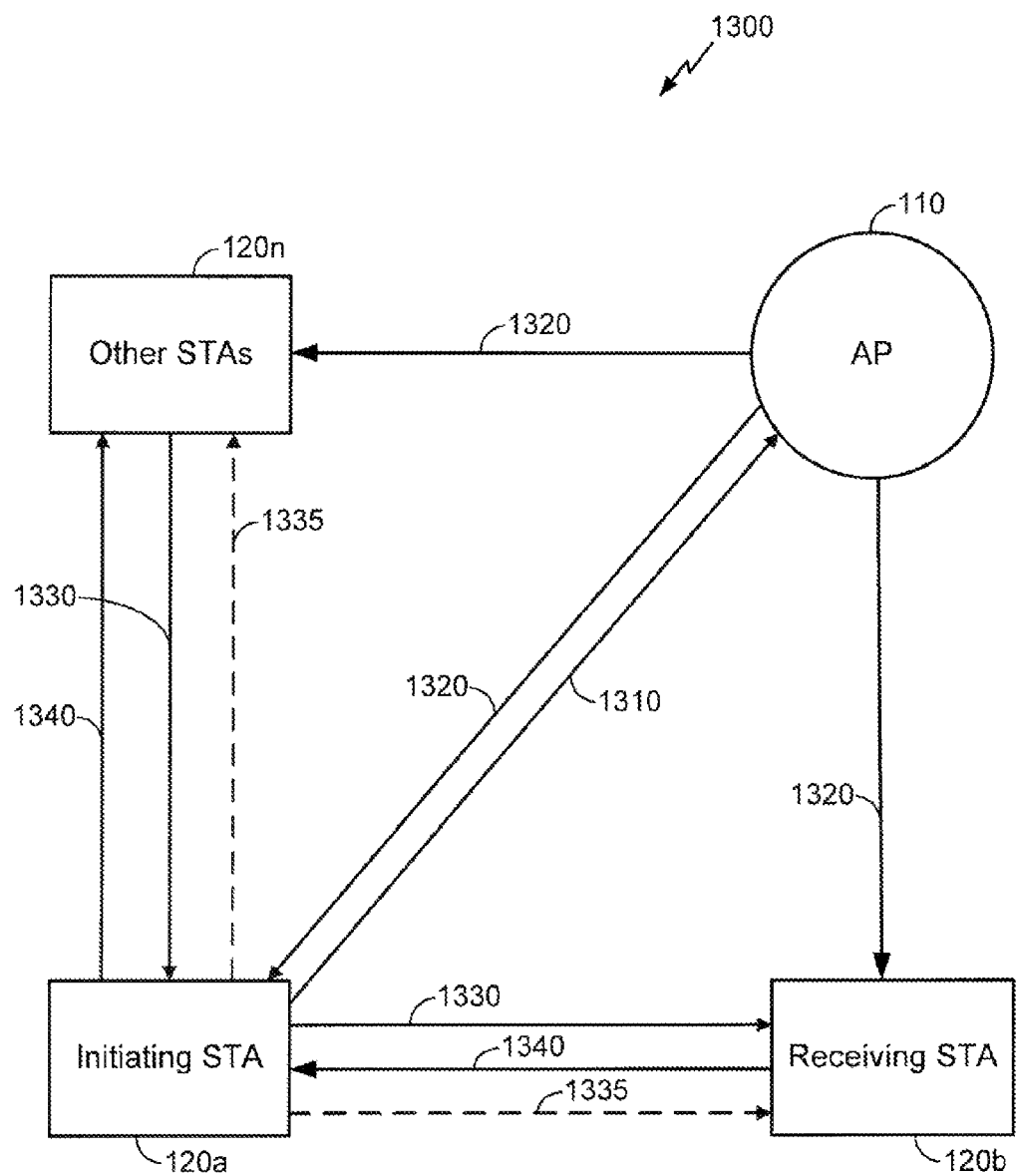
FIG. 13 is a functional block diagram illustrating an example system for establishing a direct link connection between STAs according to any one of the preceding examples.

FIG. 13 is a functional block diagram illustrating an example system 1300 for establishing a direct link connection between STAs according to any one of the preceding examples. As shown, the system 1300 includes the AP 110, the initiating STA 120a, the receiving STA 120b, and potentially other STAs 120*n* (indicating that up to 'n' STAs may thus be associated with the AP 110).

The initiating STA 120*a* may send a TDLS discovery request 1310 to the AP 110. The AP 110 sends the information in the TDLS discovery request in a broadcast 1320 to the STAs associated with the AP 110, including in this example the initiating STA 120*a*, the receiving STA 120*b*, and the other STAs 120*n*. The receiving STA 120*b* and any other direct-link capable STA from the other STAs 120*n* may then send a response message 1330 (e.g., a probe request or a probe response) to the initiating STA 120*a*. In this regard, all STAs that have received the TDLS discovery request broadcast 1320, excluding the initiating STA 120*a*, may be regarded as receiving STAs. The initiating STA 120*a* may then send an ACK 1335 to any or all of the receiving STAs, and then send a response message 1340 (e.g., a probe response) to the receiving STAs, after a backoff period.

Figure 14:
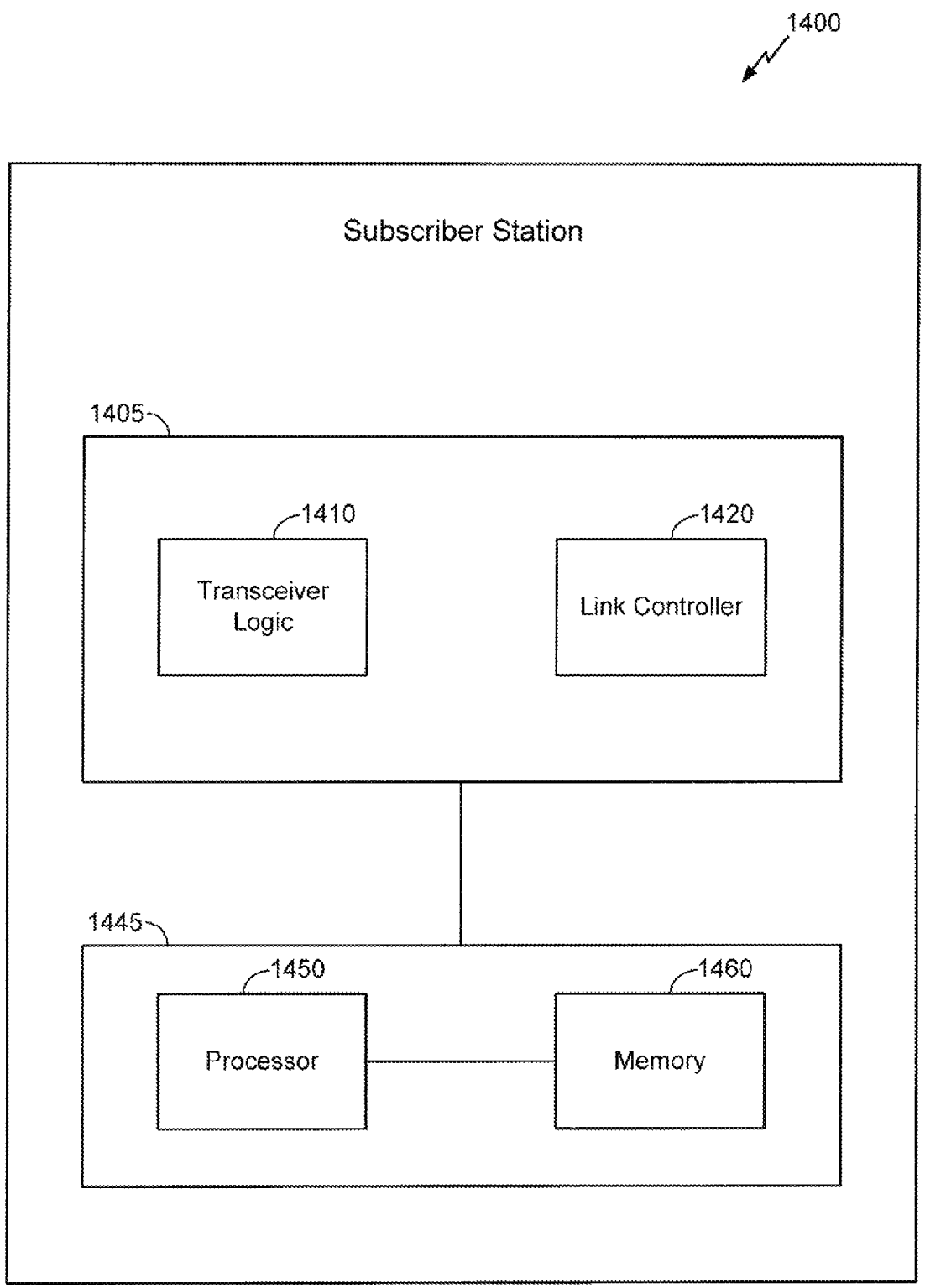
FIG. 14 is a functional block diagram illustrating an example STA that may be used for TDLS direct link setup.

FIG. 14 is a functional block diagram illustrating an example STA that may be used for TDLS direct link setup. As shown, an STA 1400 may include a TDLS module 1405 including at least transceiver logic 1410 for transmitting and/or receiving information related to a TDLS discovery request and a link controller 1420 for establishing one or more direct link connections with neighboring STAs. The STA 1400 may also include a processing module 1445, including a processor 1450 and memory 1460 coupled with the processor 1450. As described herein, a memory 1460 may include RAM, ROM, flash memory, and any storage media including optical disks and magnetic drives.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for establishing a direct link connection between subscriber stations in a wireless local area network (WLAN), the method comprising:

transmitting a direct link setup discovery request from an initiating station to an access point of the WLAN for distribution to one or more other stations, the discovery request including information concerning a capability of the initiating station for a direct link setup;

receiving, by the initiating station, a probe request message sent to the initiating station from a receiving station among the one or more other stations, a probe response message sent to the initiating station from the receiving station, or a discovery response broadcasted by the receiving station to the initiating station and any nearby stations via a directed broadcast in response to the discovery request, wherein the probe request message, probe response message, and discovery response each specify the capability of the receiving station for a direct link setup and specify an address for the receiving station; and establishing a direct link connection between the initiating station and the receiving station based on the received probe request message, probe response message, or discovery response.

2. The method of claim 1, wherein the discovery request further includes a link identifier that identifies the initiating station, the access point associated with the initiating station, and a broadcast destination for the discovery request.

3. The method of claim 1, wherein the probe request message or the probe response message is sent directly from the receiving station to the initiating station.

4. The method of claim 1, further comprising sending a probe request message from the initiating station to the receiving station following the discovery request to elicit a probe response message from the receiving station.

5. The method of claim 1, wherein the probe request message or the probe response message is broadcasted by the receiving station via a directed broadcast in response to the discovery request.

6. The method of claim 1, further comprising:

receiving a discovery request broadcasted by the access point; and broadcasting a discovery response via a directed broadcast to the one or more other stations.

7. The method of claim 1, wherein the receiving comprises receiving the probe request message.

8. The method of claim 1, wherein the receiving comprises receiving the probe response message.

9. The method of claim 1, wherein the receiving comprises receiving the discovery response.

10. A method for establishing a direct link connection between subscriber stations in a wireless local area network (WLAN), the method comprising:
receiving a direct link setup discovery request at a receiving station from an initiating station via an access point of the WLAN, the discovery request including information concerning a capability of the initiating station for a direct link setup;
transmitting a probe request message from the receiving station to the initiating station, a probe response message from the receiving station to the initiating station, or a discovery response broadcasted by the receiving station to the initiating station and any nearby stations via a directed broadcast in response to the discovery request, wherein the probe request message, probe response message, and discovery response each specify a capability of the receiving station for a direct link setup and specify an address for the receiving station; and
establishing a direct link connection between the initiating station and the receiving station based on the received probe request message, probe response message, or discovery response.

11. The method of claim 10, wherein the discovery request further includes a link identifier that identifies the initiating station, the access point associated with the initiating station, and a broadcast destination for the discovery request.

12. The method of claim 10, wherein the probe request message or the probe response message is sent directly from the receiving station to the initiating station.

13. The method of claim 10, further comprising receiving a probe request message from the initiating station following the discovery request to elicit a probe response message from the receiving station.

14. The method of claim 10, wherein the probe request message or the probe response message is broadcasted by the receiving station via a directed broadcast in response to the discovery request.

15. The method of claim 10, wherein the transmitting comprises transmitting the probe request message.

16. The method of claim 10, wherein the transmitting comprises transmitting the probe response message.

17. The method of claim 10, wherein the transmitting comprises transmitting the discovery response.

18. An apparatus for establishing a direct link connection between subscriber stations in a wireless local area network (WLAN), the apparatus comprising:
transceiver logic configured to transmit a direct link setup discovery request from an initiating station to an access point of the WLAN for distribution to one or more other stations, the discovery request including information concerning a capability of the initiating station for a direct link setup, and to receive a probe request message sent to the initiating station from a receiving station among the one or more other stations, a probe response message sent to the initiating station from the receiving station, or a discovery response broadcasted by the receiving station to the initiating station and any nearby stations via a directed broadcast in response to the discovery request, wherein the probe request message, probe response message, and discovery response each specify the capability of the receiving station for a direct link setup and specify an address for the receiving station; and
a link controller configured to establish a direct link connection between the initiating station and the receiving station based on the received probe request message, probe response message, or discovery response.

19. The apparatus of claim 18, wherein the discovery request further includes a link identifier that identifies the initiating station, the access point associated with the initiating station, and a broadcast destination for the discovery request.

20. The apparatus of claim 18, wherein the probe request message or the probe response message is sent directly from the receiving station to the initiating station.

21. The apparatus of claim 20, wherein the probe request message or the probe response message is broadcasted by the receiving station via a directed broadcast in response to the discovery request.

22. An apparatus for establishing a direct link connection between subscriber stations in a wireless local area network (WLAN), the apparatus comprising:
transceiver logic configured to receive a direct link setup discovery request at a receiving station from an initiating station via an access point of the WLAN, the discovery request including information concerning a capability of the initiating station for a direct link setup, and to transmit a probe request message from the receiving station to the initiating station, a probe response message from the receiving station to the initiating station, or a discovery response broadcasted by the receiving station to the initiating station and any nearby stations via a directed broadcast in response to the discovery request, wherein the probe request message, probe response message, and discovery response each specify a capability of the receiving station for a direct link setup and specify an address for the receiving station; and
a link controller configured to establish a direct link connection between the initiating station and the receiving station based on the received probe request message, probe response message, or discovery response.

23. The apparatus of claim 22, wherein the discovery request further includes a link identifier that identifies the initiating station, the access point associated with the initiating station, and a broadcast destination for the discovery request.

24. The apparatus of claim 22, wherein the probe request message or the probe response message is sent directly from the receiving station to the initiating station.

25. The apparatus of claim 24, wherein the probe request message or the probe response message is broadcasted by the receiving station via a directed broadcast in response to the discovery request.

26. An apparatus for establishing a direct link connection between subscriber stations in a wireless local area network (WLAN), the apparatus comprising:
means for transmitting a direct link setup discovery request from an initiating station to an access point of the WLAN for distribution to one or more other stations, the discovery request including information concerning a capability of the initiating station for a direct link setup;
means for receiving, by the initiating station, a probe request message sent to the initiating station from a receiving station among the one or more other stations, a probe response message sent to the initiating station from the receiving station, or a discovery response broadcasted by the receiving station to the initiating station and any nearby stations via a directed broadcast in response to the discovery request, wherein the probe request message, probe response message, and discovery response each specify the capability of the receiving station for a direct link setup and specify an address for the receiving station; and means for establishing a direct link connection between the initiating station and the receiving station based on the received probe request message, probe response message, or discovery response.

27. An apparatus for establishing a direct link connection between subscriber stations in a wireless local area network (WLAN), the apparatus comprising:

means for receiving a direct link setup discovery request at a receiving station from an initiating station via an access point of the WLAN, the discovery request including information concerning a capability of the initiating station for a direct link setup;

means for transmitting a probe request message from the receiving station to the initiating station, a probe response message from the receiving station to the initiating station, or a discovery response broadcasted by the receiving station to the initiating station and any nearby stations via a directed broadcast in response to the discovery request, wherein the probe request message, probe response message, and discovery response each specify a capability of the receiving station for a direct link setup and specify an address for the receiving station; and means for establishing a direct link connection between the initiating station and the receiving station based on the received probe request message, probe response message, or discovery response.

28. A non-transitory computer-readable medium comprising code, which, when executed by a processor, causes the processor to perform operations for establishing a direct link connection between subscriber stations in a wireless local area network (WLAN), the computer-readable medium comprising:

code for transmitting a direct link setup discovery request from an initiating station to an access point of the WLAN for distribution to one or more other stations, the discovery request including information concerning a capability of the initiating station for a direct link setup;

code for receiving, by the initiating station, a probe request message sent to the initiating station from a receiving station among the one or more other stations, a probe response message sent to the initiating station from the receiving station, or a discovery response broadcasted by the receiving station to the initiating station and any nearby stations via a directed broadcast in response to the discovery request, wherein the probe request message, probe response message, and discovery response each specify the capability of the receiving station for a direct link setup and specify an address for the receiving station; and code for establishing a direct link connection between the initiating station and the receiving station based on the received probe request message, probe response message, or discovery response.

29. A non-transitory computer-readable medium comprising code, which, when executed by a processor, causes the processor to perform operations for establishing a direct link connection between subscriber stations in a wireless local area network (WLAN), the computer-readable medium comprising:

code for receiving a direct link setup discovery request at a receiving station from an initiating station via an access point of the WLAN, the discovery request including information concerning a capability of the initiating station for a direct link setup;

code for transmitting a probe request message from the receiving station to the initiating station, a probe response message from the receiving station to the initiating station, or a discovery response broadcasted by the receiving station to the initiating station and any nearby stations via a directed broadcast in response to the discovery request, wherein the probe request message, probe response message, and discovery response each specify a capability of the receiving station for a direct link setup and specify an address for the receiving station; and code for establishing a direct link connection between the initiating station and the receiving station based on the received probe request message, probe response message, or discovery response.

* * * * *